US012625104B2

(12) United States Patent
      Cui

(10) Patent No.:    US 12,625,104 B2
(45) Date of Patent:        May 12, 2026

(54) METHOD FOR IMPROVING STABILITY OF ELECTROCHEMICAL SENSOR

(71) Applicant: Peking University, Beijing (CN)

(72) Inventor: Yue Cui, Beijing (CN)

( * ) Notice: Subject to any disclaimer, the term of this patent is extended or adjusted under 35 U.S.C. 154(b) by 228 days.

(21) Appl. No.: 18/359,997

(22) Filed: Jul. 27, 2023

(65) Prior Publication Data

US 2024/0085362 A1      Mar. 14, 2024

(30) Foreign Application Priority Data

Jul. 29, 2022    (CN) .......................... 202210913635.5

(51) Int. Cl.
      *G01N 27/327*        (2006.01)
      *C08G 73/02*         (2006.01)
      *C08L 29/04*         (2006.01)
      *C08L 75/04*         (2006.01)
      *C08L 79/00*         (2006.01)

(52) U.S. Cl.
      CPC ..... *G01N 27/3272* (2013.01); *C08G 73/0266* (2013.01); *C08L 29/04* (2013.01); *C08L 75/04* (2013.01); *C08L 79/00* (2013.01)

(58) Field of Classification Search
      None
      See application file for complete search history.

(56) References Cited

U.S. PATENT DOCUMENTS

| | | | |
|---|---|---|---|
| 5,795,774 A | * | 8/1998 | Matsumoto ............ C12Q 1/002 |
| | | | 204/403.12 |
| 2003/0199745 A1 | * | 10/2003 | Burson .................... A61N 1/30 |
| | | | 600/347 |
| 2009/0236222 A1 | * | 9/2009 | Murase .................... C12Q 1/61 |
| | | | 204/403.14 |

(Continued)

FOREIGN PATENT DOCUMENTS

| | | | | | |
|---|---|---|---|---|---|
| CN | 110618179 A | * | 12/2019 | | |
| CN | 113311054 A | * | 8/2021 | ............ | B32B 27/30 |

OTHER PUBLICATIONS

P.D. Gaikwad, et al., "Immobilization of GOD on Electrochemically Synthesized PANI Film by Cross-linking via Glutaraldehyde for Determination of Glucose", International Journal of Electrochemical Science, 1(8): p. 425-434, Dec (Year: 2006).*

*Primary Examiner* — J. Christopher Ball

(57)                ABSTRACT

The present disclosure provides a method for improving stability of an electrochemical sensor. The method includes the following steps: S1, manufacturing an electrochemical sensor; S2, immobilizing a biosensitive molecular enzyme on a working electrode of the electrochemical sensor; S3, setting a immobilization agent on a surface of the biosensitive molecular enzyme; and S4, adding a protective film on a surface of the immobilization agent, such that the protective film is deposited on the working electrode to improve the stability of the electrochemical sensor. In the present disclosure, glutaraldehyde (GA), polyvinyl alcohol (PVA), and polyethylene glycol (PEG), or polyaniline (PANI), the (Continued)

```
┌─────────────────────────┐
│     Manufacture of      │
│  electrochemical sensor │
└─────────────────────────┘
             │
             ▼
┌─────────────────────────┐
│     Addition of PANI    │
└─────────────────────────┘
             │
             ▼
┌─────────────────────────┐
│ Immobilization of       │
│ biosensitive            │
│ molecular enzyme        │
└─────────────────────────┘
             │
             ▼
┌─────────────────────────┐
│      Addition of GA     │
└─────────────────────────┘
             │
             ▼
┌─────────────────────────┐
│      Addition of PU     │
└─────────────────────────┘
             │
             ▼
┌─────────────────────────┐
│  Coverage with PVA/PEG  │
│         mixture         │
└─────────────────────────┘
```

GA, the PVA, the PEG, and polyurethane (PU) are arranged on a surface of the biosensitive molecular enzyme. Therefore, the surface of the biosensitive molecular enzyme forms a composite protective film, which reduces a probability of direct exposure of an enzyme layer to the air.

9 Claims, 17 Drawing Sheets

(56) References Cited

U.S. PATENT DOCUMENTS

2015/0276651 A1* 10/2015 Petisce ...................... C23F 1/26
                                                    216/13
2017/0325724 A1* 11/2017 Wang ................... A61B 5/6833

* cited by examiner

METHOD FOR IMPROVING STABILITY OF ELECTROCHEMICAL SENSOR

CROSS REFERENCE TO RELATED APPLICATION

This patent application claims the benefit and priority of Chinese Patent Application No. 202210913635.5, filed with the China National Intellectual Property Administration on Jul. 29, 2022, the disclosure of which is incorporated by reference herein in its entirety as part of the present application.

TECHNICAL FIELD

The present disclosure relates to the technical field of electrochemical sensors, in particular to a method for improving stability of an electrochemical sensor.

BACKGROUND

Biosensors are composed of two main parts, namely biometric components and signal converters. The biometric component refers to a bioactive substance that has molecular recognition ability and can specifically react with a substance to be tested. The biometric component includes enzymes, antigens, antibodies, nucleic acids, cells, and tissues. The signal converter mainly converts a biometric function into a detectable signal. Currently, commonly used detection methods include electrochemical methods, optical methods, thermal methods, and mass analysis methods. The electrochemical method is the most ideal detection method.

Electrochemical biosensors adopt a solid electrode as a basic electrode, and biosensitive molecules are immobilized on a surface of the basic electrode. Through the specific recognition between biomolecules, the biosensitive molecules can selectively recognize and capture target molecules on the surface of the basic electrode. The basic electrode acts as a signal conductor to derive a recognition reaction signal generated on its surface and convert into a measurable electrical signal, thereby achieving quantitative or qualitative analysis of an analyte.

Various types of electrochemical biosensor can be formed by combining various biomolecules (such as antibodies, DNAs, enzymes, microorganisms, or whole cells) with electrochemical transducers (including current type, potential type, capacitive type, and conductivity type). According to different biosensitive molecules immobilized on an electrode surface, the electrochemical biosensors can be classified into electrochemical immunosensors, electrochemical DNA sensors, electrochemical enzyme sensors, electrochemical microbial sensors, and electrochemical tissue cell sensors. The electrochemical enzyme sensor refers to the indirect determination of a concentration of the analyte by recording changes through a transducer after the chemical change of biomolecules occurs under the catalysis of an immobilized enzyme. However, enzymes have a poor storage stability at room temperature, and the stability of enzymes during long-term storage is extremely important for the practical application of sensors. In order to improve the storage stability of enzymes at room temperature, this application proposes a method for improving stability of an electrochemical sensor.

SUMMARY

In order to solve the above problems, the present disclosure provides a method for improving stability of an electrochemical sensor.

The foregoing technical objective of the present disclosure is achieved by the following technical solutions: the present disclosure provides a method for improving stability of an electrochemical sensor, including the following steps:

S1, manufacturing an electrochemical sensor;

S2, immobilizing a biosensitive molecular enzyme on a working electrode of the electrochemical sensor;

S3, setting an immobilization agent on a surface of the biosensitive molecular enzyme; and S4, adding a protective film on a surface of the immobilization agent, such that the protective film is deposited on the working electrode to improve the stability of the electrochemical sensor.

Further, a process for manufacturing the electrochemical sensor includes micro/nanofabrication and screen printing;

the electrochemical sensor is a three-electrode system including a reference electrode, a working electrode, and a counter electrode, or a two-electrode system including the working electrode and the reference electrode, or a two-electrode system including the working electrode and the counter electrode; and the working electrode is one or a combination of more selected from the group consisting of gold, platinum, and carbon.

Further, a process for the micro/nanofabrication of the three-electrode system includes:

(1) preparation of the working electrode and the counter electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference electrode: conducting sputtering or metal evaporation to form a silver electrode, and immersing the silver electrode in a ferric chloride solution, such that some silver generates silver chloride through a chemical reaction, thereby obtaining a silver/chloride silver electrode; and a process for the micro/nanofabrication of the two-electrode system includes:

(1) preparation of the working electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference/counter electrode: conducting sputtering or metal evaporation to form a silver electrode, and immersing the silver electrode in a ferric chloride solution, such that some silver generates silver chloride through a chemical reaction, thereby obtaining a silver/chloride silver electrode.

Further, a process for the screen printing of the three-electrode system includes:

(1) preparation of the working electrode and the counter electrode: conducting screen printing with a gold composite paste, a platinum composite paste, and a carbon composite paste that generally include a electronic mediator such as Prussian blue; and (2) preparation of the reference electrode: conducting screen printing with a silver/silver chloride composite paste; and a process for the screen printing of the two-electrode system includes:

(1) preparation of the working electrode: conducting screen printing with a gold composite paste, a platinum composite paste, and a carbon composite paste; and (2) preparation of the reference/counter electrode: conducting screen printing with a silver/silver chloride composite paste.

Further, the biosensitive molecular enzyme is an enzyme or an enzyme mixture that is uricase for a uric acid sensor, or a mixture of creatinine amidohydrolase, creatine amidinohydrolase and sarcosine oxidase for a creatinine biosensor, or glucose oxidase for a glucose biosensor, or cholesterol oxidase for a cholesterol biosensor, or a mixture of lipase, glycerol kinase, and glycerol phosphate oxidase for a triglyceride biosensor.

Further, polyaniline (PANI) is added before immobilizing the biosensitive molecular enzyme.

Further, polyurethane (PU) is added after setting the immobilization agent.

Further, the immobilization agent is glutaraldehyde (GA).

Further, the protective film has a principal component of polyvinyl alcohol (PVA).

Further, the protective film is a composite film prepared from PVA and polyethylene glycol (PEG).

Further, an electronic mediator is added to a carbon composite ink obtained by screen printing.

Further, the electronic mediator is Prussian blue.

To sum up, the present disclosure has the following beneficial effects:

The uricase provided on the surface of the electrochemical sensor can detect the concentration of uric acid in the substance to be tested. If the mixture of creatinine amidohydrolase, creatine amidinohydrolase and sarcosine oxidase is added on the surface of the electrochemical sensor, the concentration of creatinine in the substance to be tested can be detected.

The surface of biosensitive molecular enzymes is provided with GA, PVA, and PEG, or PANI, GA, PVA/PEG, and PU. Therefore, the surface of the biosensitive molecular enzyme forms a composite protective film, which reduces a probability of direct exposure of an enzyme layer to the air. In this way, the protective film plays a better role in stabilizing and protecting the biosensitive molecular enzyme, thereby significantly improving a storage stability of biosensors such as uric acid or creatinine at a room temperature.

The Prussian blue added to the gold composite paste, platinum composite paste, or carbon composite paste for screen printing is capable of signal conversion. In this way, it is convenient for the user to detect a substance to be tested, thereby obtaining the relationship between a concentration of the substance to be tested and a current.

Figure 1:
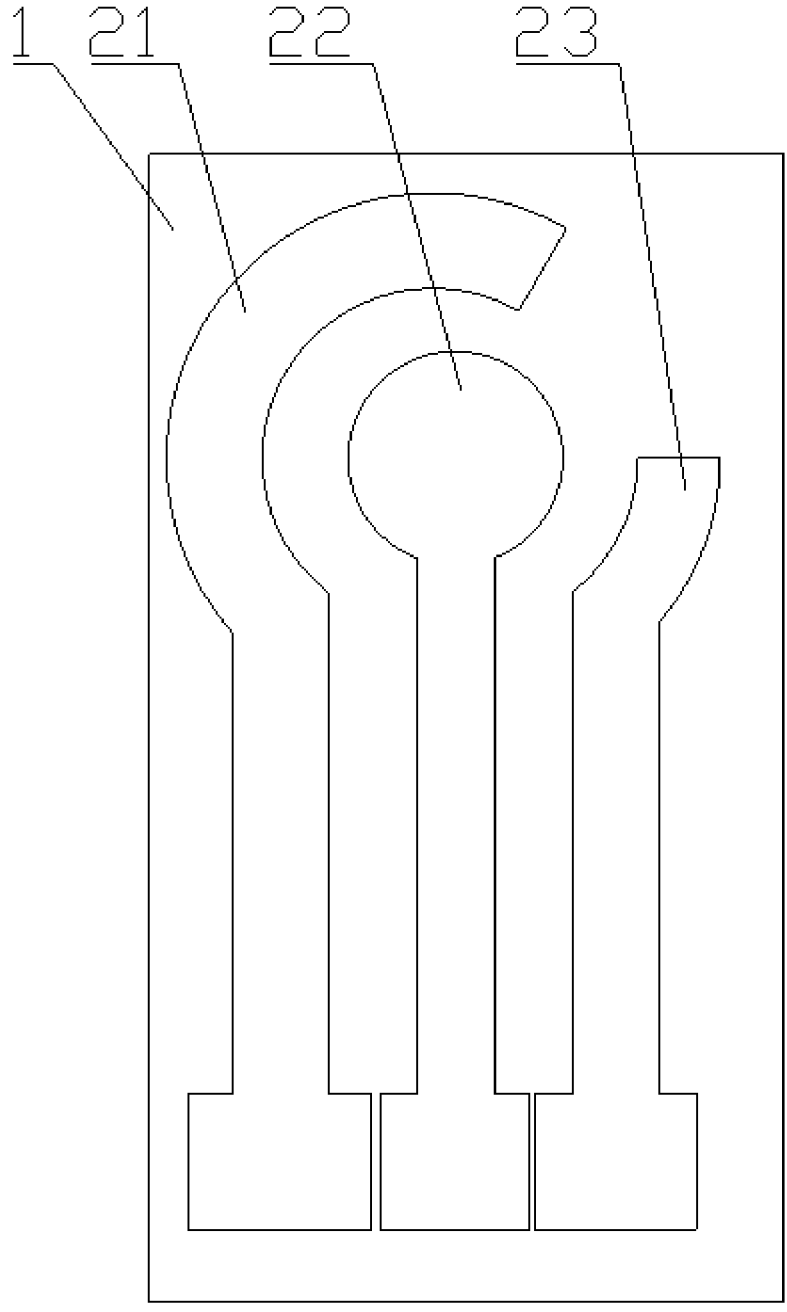
FIG. 1 shows a plan view of three electrodes that form an electrochemical sensor in the present disclosure.
Figure 2:
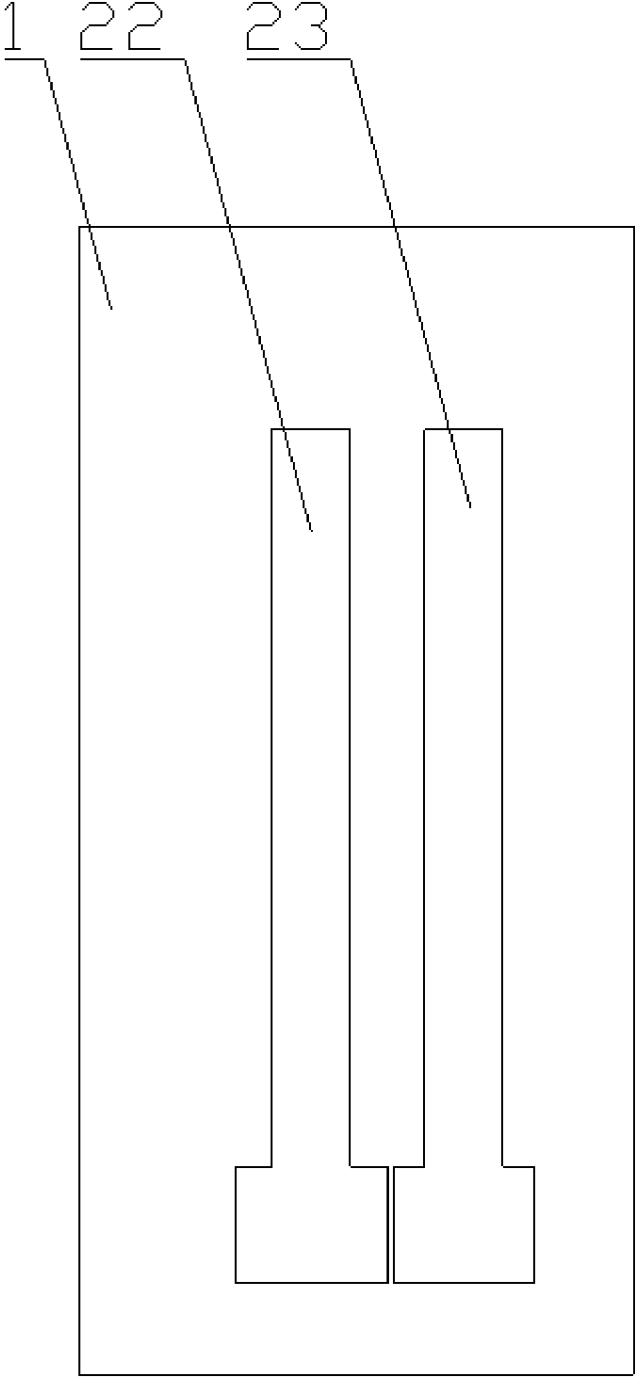
FIG. 2 shows a plan view of two electrodes that form an electrochemical sensor in the present disclosure.
Figure 3:
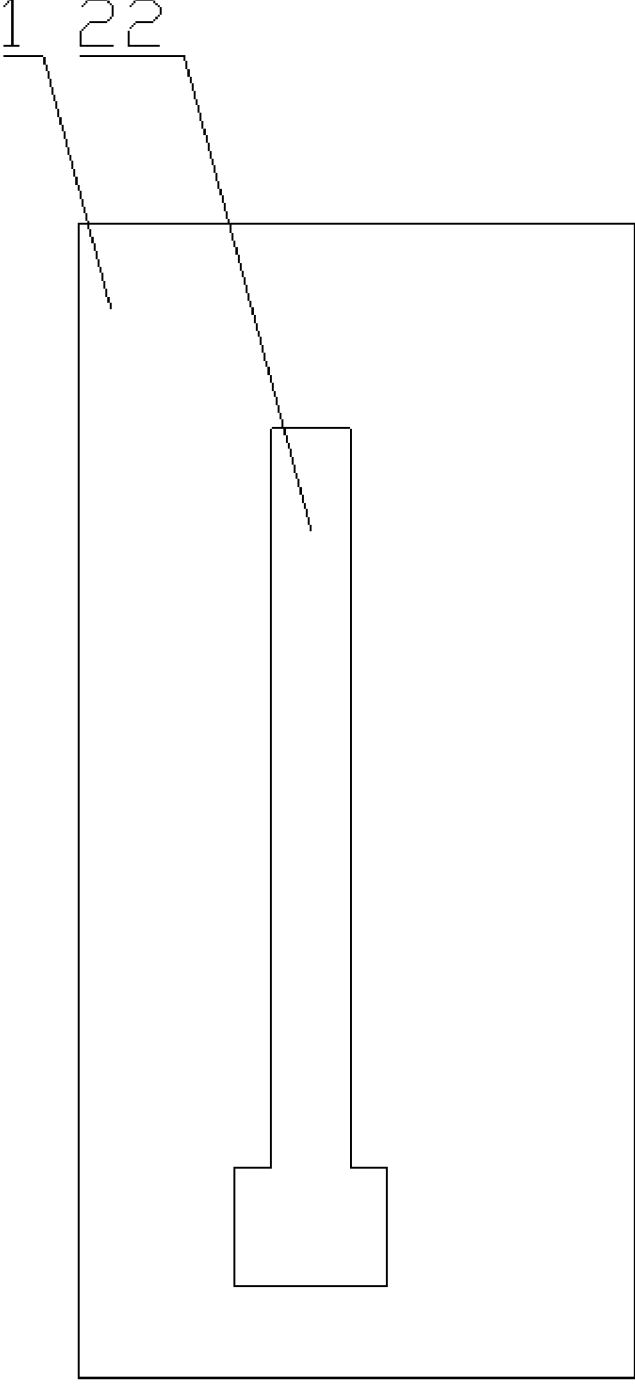
FIG. 3 shows a plan view that an electrode layer is arranged on both sides of a base layer in the present disclosure.
Figures 4, 5:
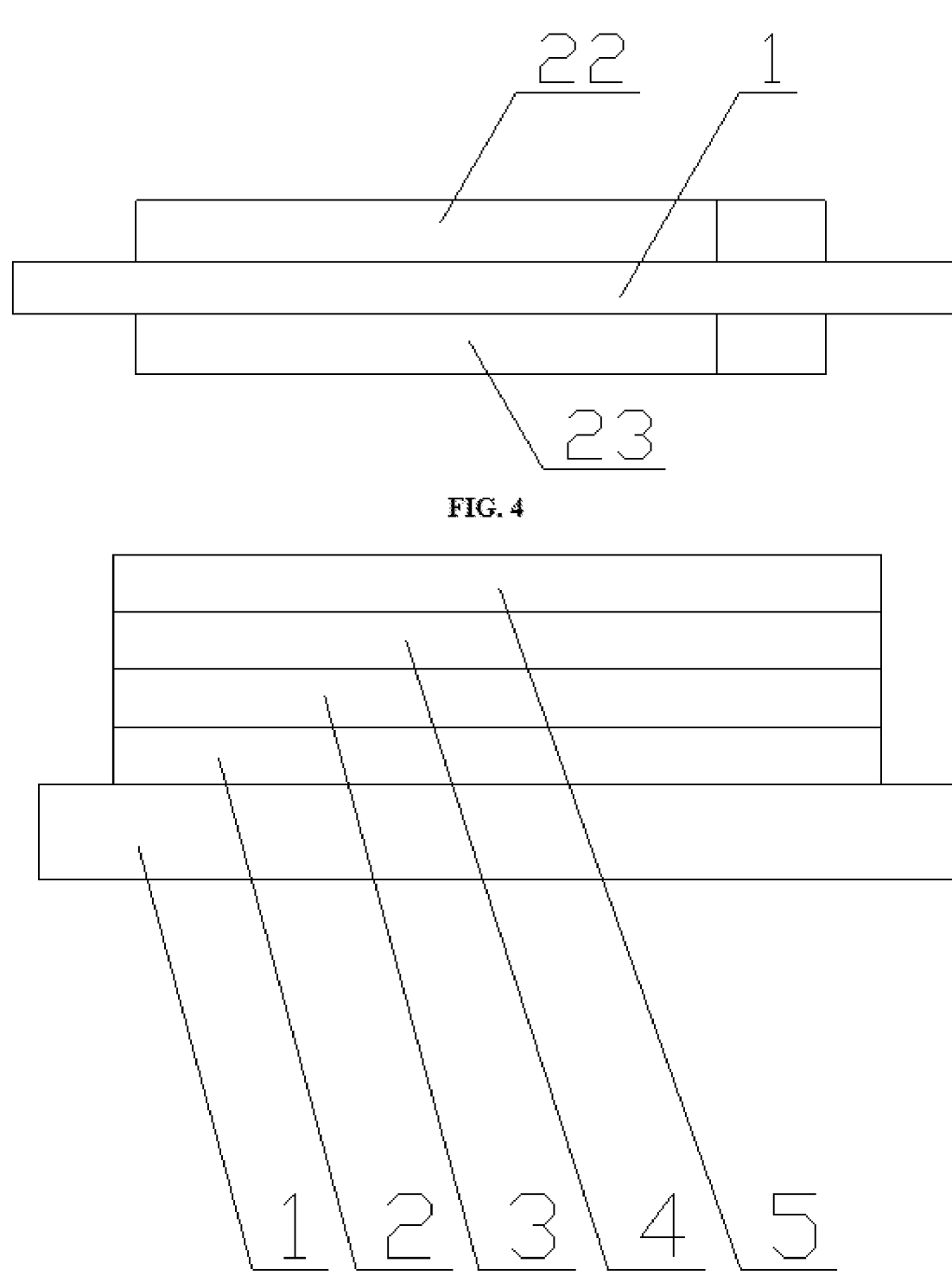
FIG. 4 shows a side view of FIG. 3.
FIG. 5 shows a cross-sectional view of an example in the present disclosure.
Figure 6:
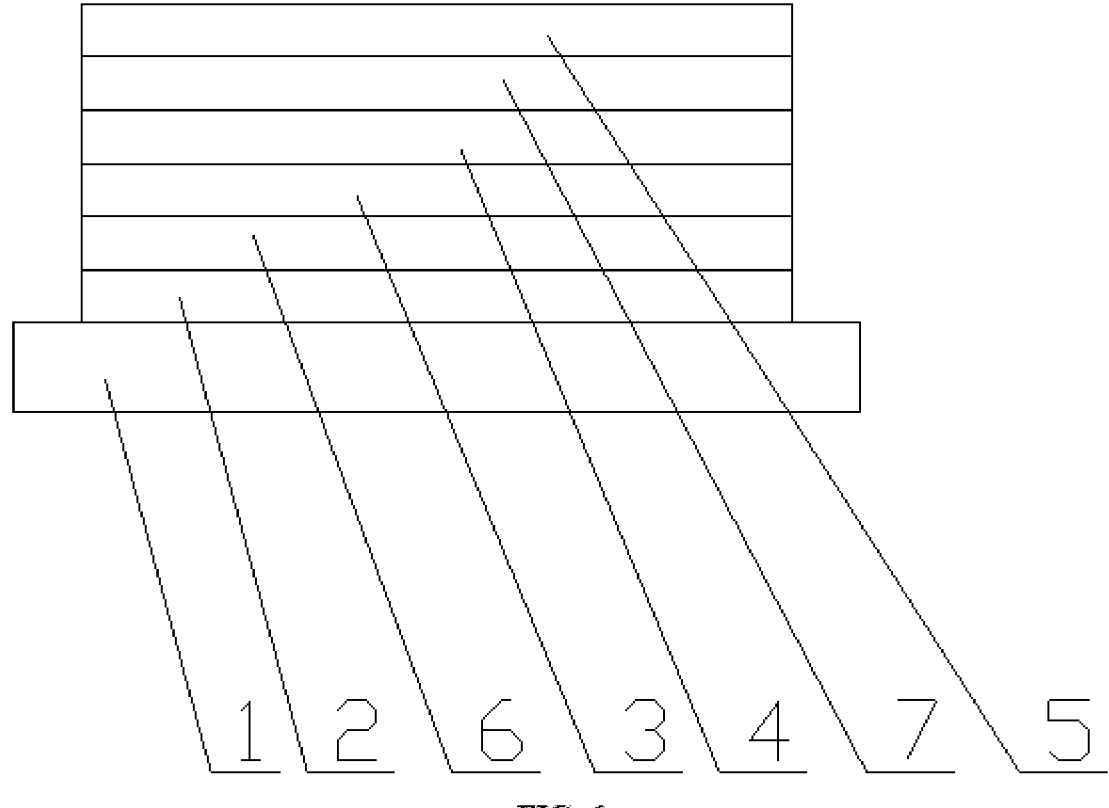
FIG. 6 shows a cross-sectional view of the example in FIG. 3 after adding PANI and PU.
Figure 7:
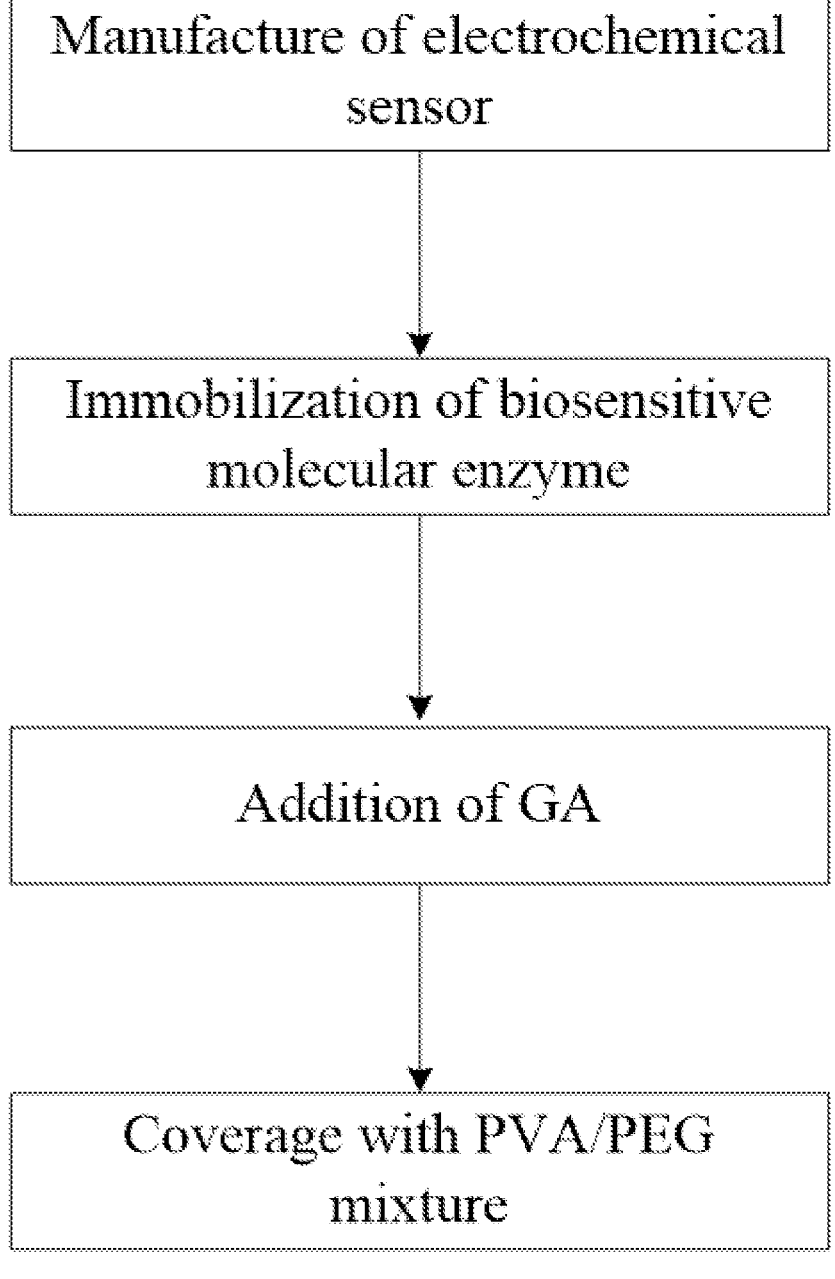
FIG. 7 shows a flow chart of the example in the present disclosure.
Figure 8:
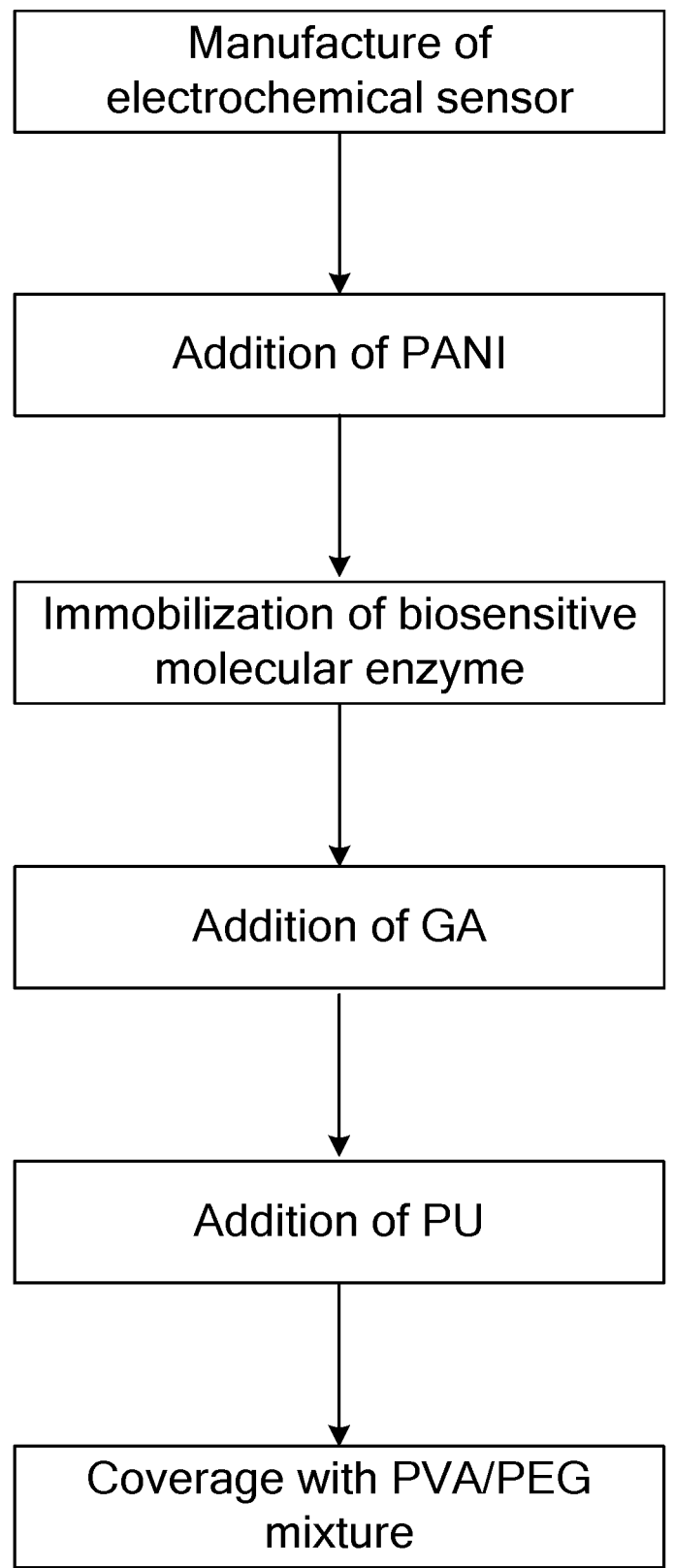
FIG. 8 shows a flow chart of the example in the present disclosure after adding PANI and PU.
Figure 9:
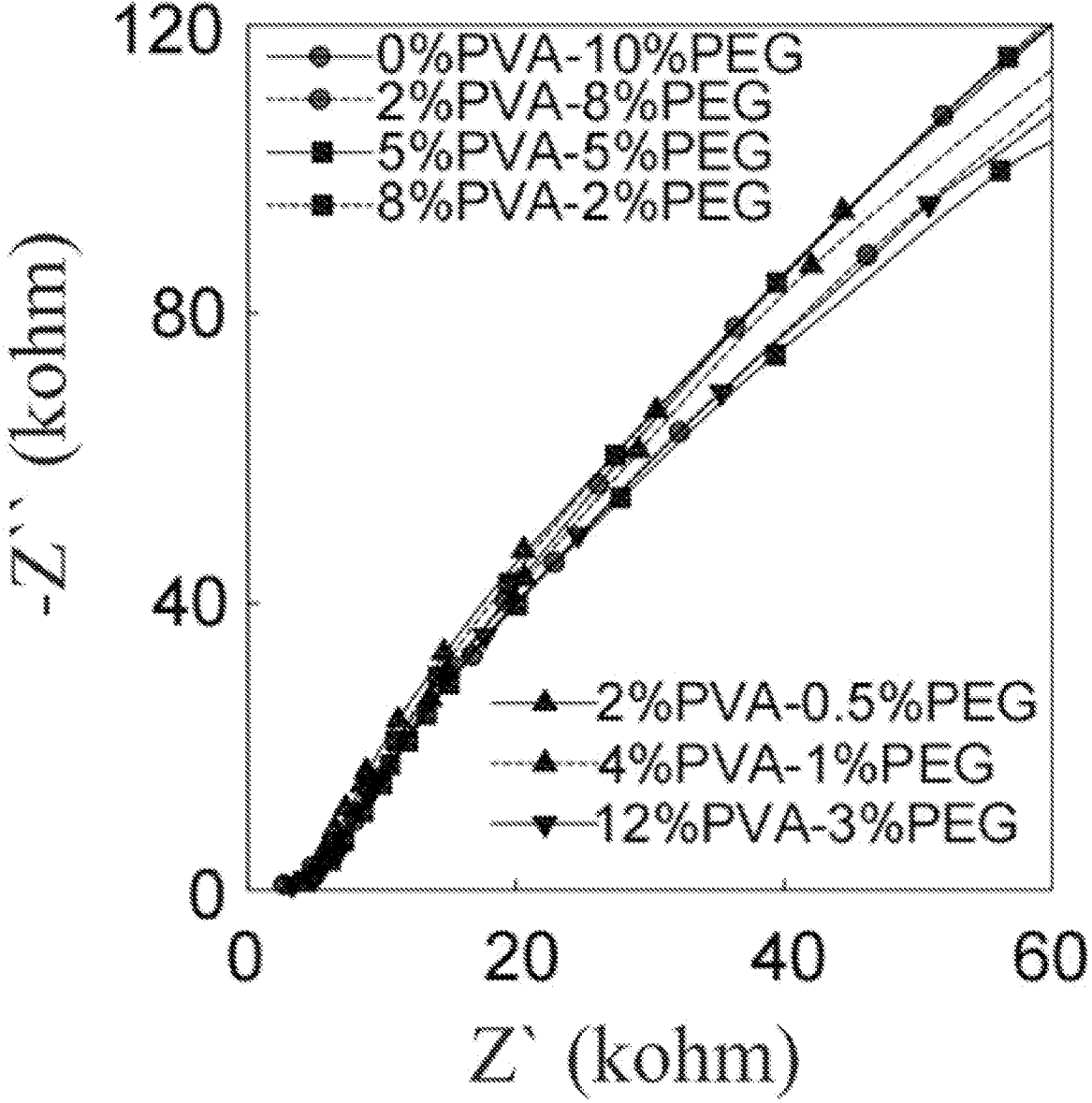
FIG. 9 shows a Nyquist plot of a biosensor with PVA/PEG films at different concentrations in the example of the present disclosure.
Figure 10:
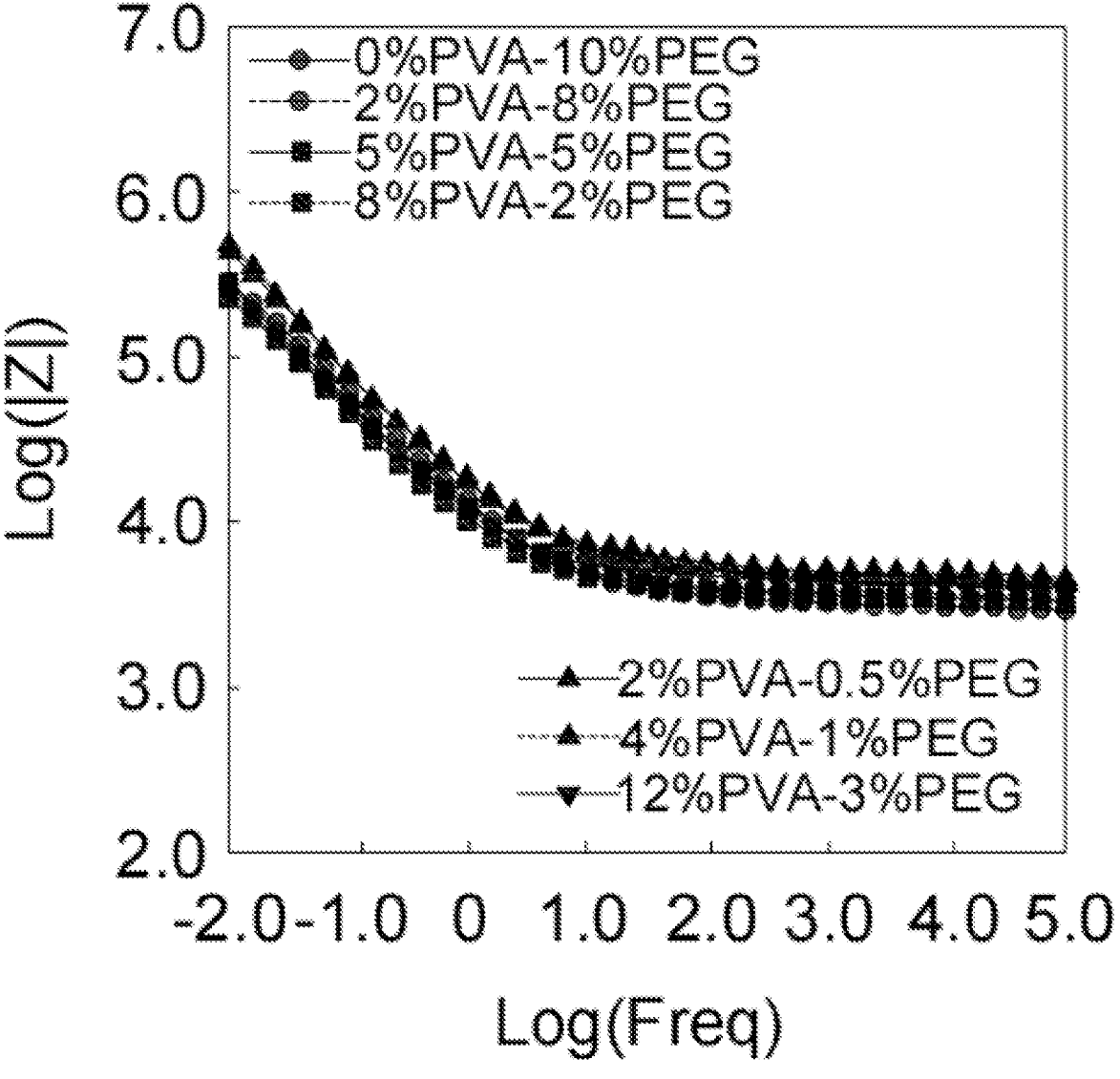
FIG. 10 shows a Bode plot of the biosensor with PEG films at different concentrations in the example of the present disclosure.

References in the figure: 1. Base layer; 2. Electrode layer; 21. Counter electrode; 22. Working electrode; 23. Reference electrode; 3. Enzyme layer; 4. Glutaraldehyde (GA) layer; 5. Polyvinyl alcohol/polyethylene glycol (PVA/PEG) layer; 6. Polyaniline (PANI) layer; and 7. Polyurethane (PU) layer.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts should fall within the protection scope of the present disclosure.

As shown in FIG. 1 to FIG. 18, the present disclosure provides a method for improving stability of an electrochemical sensor, including the following steps:

S1, manufacture of an electrochemical sensor by micro/nanofabrication or screen printing;

the electrochemical sensor is a three-electrode system including a reference electrode, a working electrode, and a counter electrode, or a two-electrode system including the working electrode and the reference electrode, or a two-electrode system including the working electrode and the counter electrode; and

a process for the micro/nanofabrication of the three-electrode system includes:

(1) preparation of the working electrode and the counter electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference electrode: conducting sputtering or metal evaporation to form a silver electrode, and immersing the silver electrode in a ferric chloride solution, such that some silver generates silver chloride through a chemical reaction, thereby obtaining a silver/chloride silver electrode; and a process for the micro/nanofabrication of the two-electrode system includes:

(1) preparation of the working electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference/counter electrode: conducting sputtering or metal evaporation to form a silver electrode, and immersing the silver electrode in a ferric chloride solution, such that some silver generates silver chloride through a chemical reaction, thereby obtaining a silver/chloride silver electrode.

a process for the screen printing of the three-electrode system includes:

(1) preparation of the working electrode and the counter electrode: conducting screen printing with a gold composite paste, a platinum composite paste, and a carbon composite paste that generally include a electronic mediator such as Prussian blue; and (2) preparation of the reference electrode: conducting screen printing with a silver/silver chloride composite paste; and a process for the screen printing of the two-electrode system includes:

(1) preparation of the working electrode: conducting screen printing with a gold composite paste, a platinum composite paste, and a carbon composite paste; and (2) preparation of the reference/counter electrode: conducting screen printing with a silver/silver chloride composite paste;

S2, immobilizing a biosensitive molecular enzyme on a working electrode of the electrochemical sensor;

the biosensitive molecular enzyme is an enzyme or an enzyme mixture that can be uricase for a uric acid sensor, or a mixture of creatinine amidohydrolase, creatine amidinohydrolase and sarcosine oxidase for a creatinine biosensor, or glucose oxidase for a glucose biosensor, or cholesterol oxidase for a cholesterol biosensor, or a mixture of lipase, glycerol kinase, and glycerol phosphate oxidase for a triglyceride biosensor;

S3, setting a GA layer on a surface of the biosensitive molecular enzyme; and

S4, adding a protective film on a surface of the immobilization agent, such that the protective film is deposited on the working electrode to improve the stability of the electrochemical sensor; where

6 the protective film is selected from the group consisting of PVA, PEG, and a composite film composed of the PVA and the PEG;

S5, adding a PANI layer on an electrode layer; and

S6, adding a PU layer on the GA layer.

The surface of biosensitive molecular enzymes is provided with PVA, PVA, and PEG. Therefore, the surface of the biosensitive molecular enzyme forms a composite protective film with a multilayer structure, which reduces a probability of direct exposure of an enzyme layer to the air. In this way, the protective film plays a better role in stabilizing and protecting the biosensitive molecular enzyme, thereby significantly improving a storage stability of biosensors such as uric acid or creatinine at a room temperature.

Example 1

In this example, two methods for improving stability of an electrochemical sensor were provided. A first method (FIG. 9 to FIG. 12, all obtained by this method) included the following steps:

S1, a reference electrode, a working electrode, and a counter electrode of an electrochemical sensor were manufactured by micro/nanofabrication;

S2, uricase was immobilized on the working electrode;

S3, a GA layer was set on a surface of the biosensitive molecular enzyme (uricase); and S4, a protective film composed of PVA and PEG was added on a surface of the GA layer, such that the composite film was deposited on the working electrode to improve the stability of the biological electrochemical sensor.

A second method for improving stability of an electrochemical sensor (FIG. 14 to FIG. 18, all obtained by this method) included the following steps:

S1, a reference electrode, a working electrode, and a counter electrode of an electrochemical sensor were manufactured by micro/nanofabrication;

S2, a layer of PANI was deposited on the working electrode, and glucose oxidase was immobilized on the working electrode;

S3, a GA layer was deposited on a surface of the biosensitive molecular enzyme (glucose oxidase), and a PU layer was deposited on a surface of the GA layer; and S4, a composite film composed of PVA/PEG was deposited on a surface of the PU layer.

Example 2

This example differed from Example 1 only in that: in S1, the electrochemical sensor was manufactured by screen printing.

Example 3

This example differed from Example 1 only in that: in S1, the electrochemical sensor included a reference/counter electrode and a working electrode.

Example 4

This example differed from Example 1 only in that: the uricase was replaced by a mixture of creatinine amidohydrolase, creatine amidinohydrolase and sarcosine oxidase.

Example 5

This example differed from Example 1 only in that: the uricase was replaced by glucose oxidase.

Example 6

This example differed from Example 1 only in that: the uricase was replaced by cholesterol oxidase.

Example 7

This example differed from Example 1 only in that: the uricase was replaced by a mixture of lipase, glycerol kinase, and glycerol phosphate oxidase.

Example 8

This example differed from Example 1 only in that: the PVA/PEG composite film was replaced by PVA or PEG.

Example 9

This example differed from Example 1 only in that: PANI was added before immobilizing the biosensitive molecular enzyme.

Example 10

This example differed from Example 1 only in that: PU was added after setting the immobilization agent.

Test 1

Nyquist experiments of biosensors with different PVA and PEG film contents were conducted in PBS containing 0.4 mM uric acid. The results were shown in FIG. 9, and these electrodes exhibited similar electron transfer resistances.

Test 2

Bode analysis of biosensors with different PVA and PEG film contents were conducted in PBS containing 0.4 mM uric acid. The results were shown in FIG. 10.

Test 3

The relative response values of biosensors with different PVA and PEG film contents were determined in PBS containing 0.4 mM uric acid. The results were shown in FIG. 11.

Figure 11:
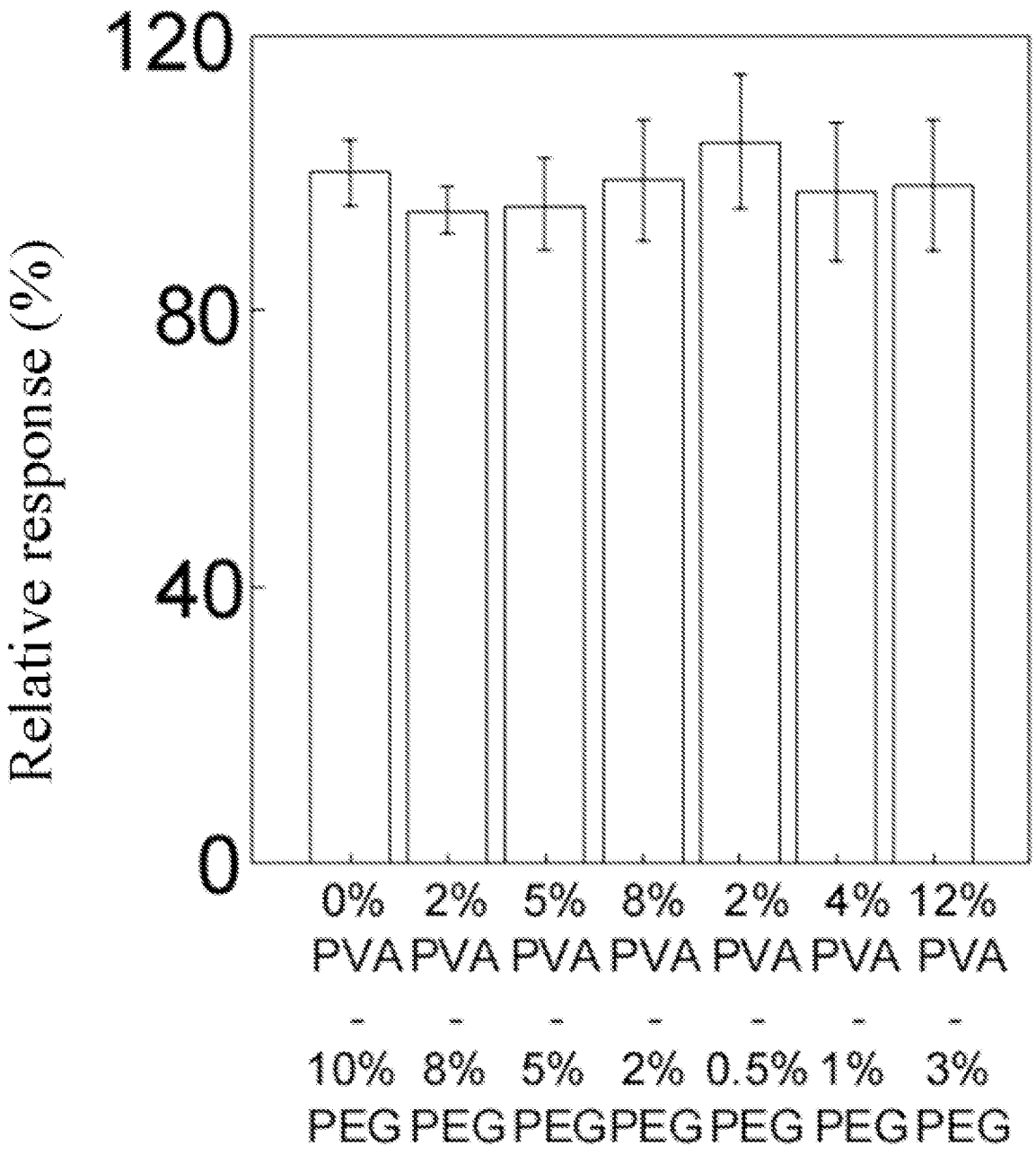
FIG. 11 shows a relative response diagram of uric acid in a phosphate-buffered saline (PBS) solution detected by the biosensor with PVA/PEG films at different concentrations in the example of the present disclosure.
Figure 12:
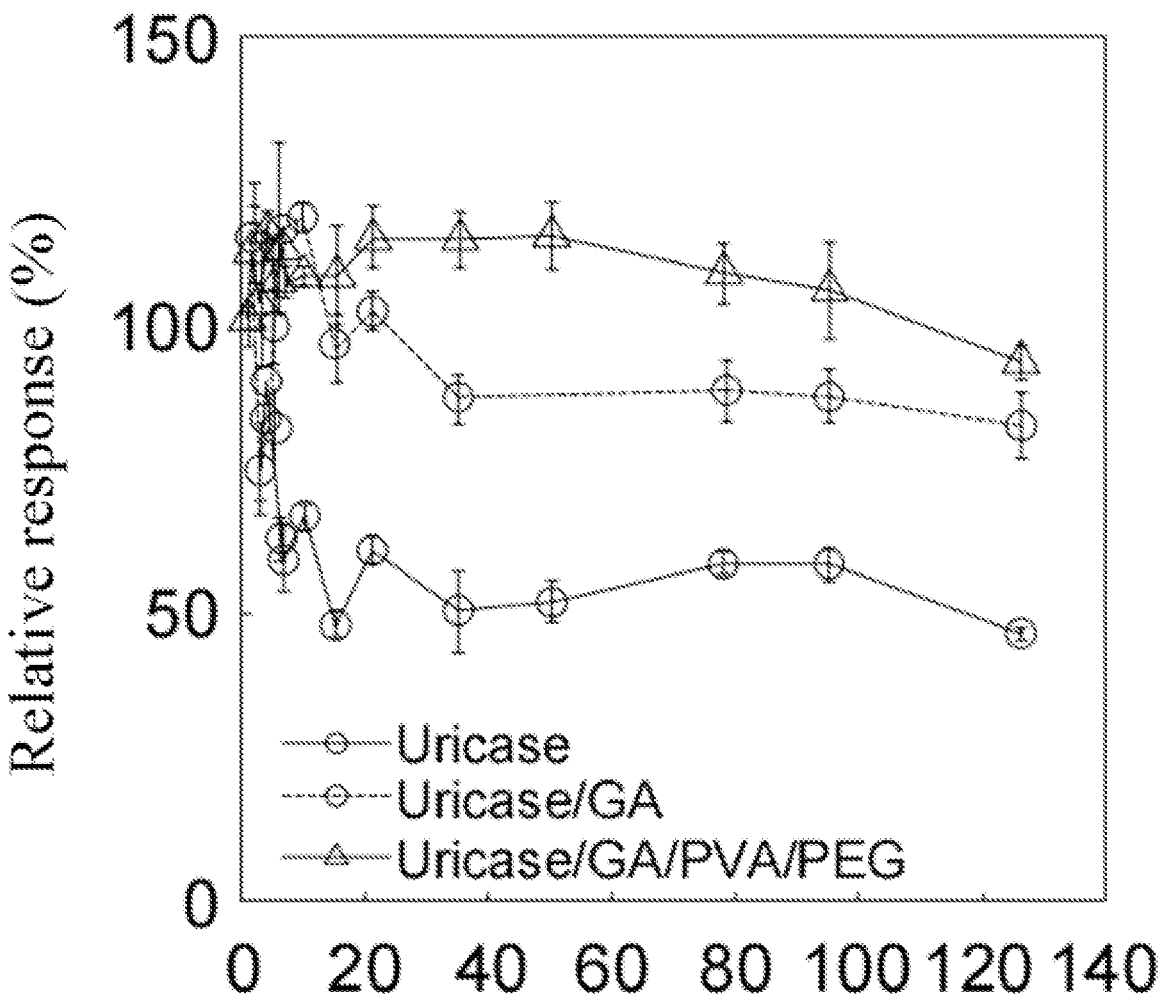
FIG. 12 shows a schematic diagram of results for stability detection of the electrochemical sensor at room temperature in an example of the present disclosure.
Figure 13:
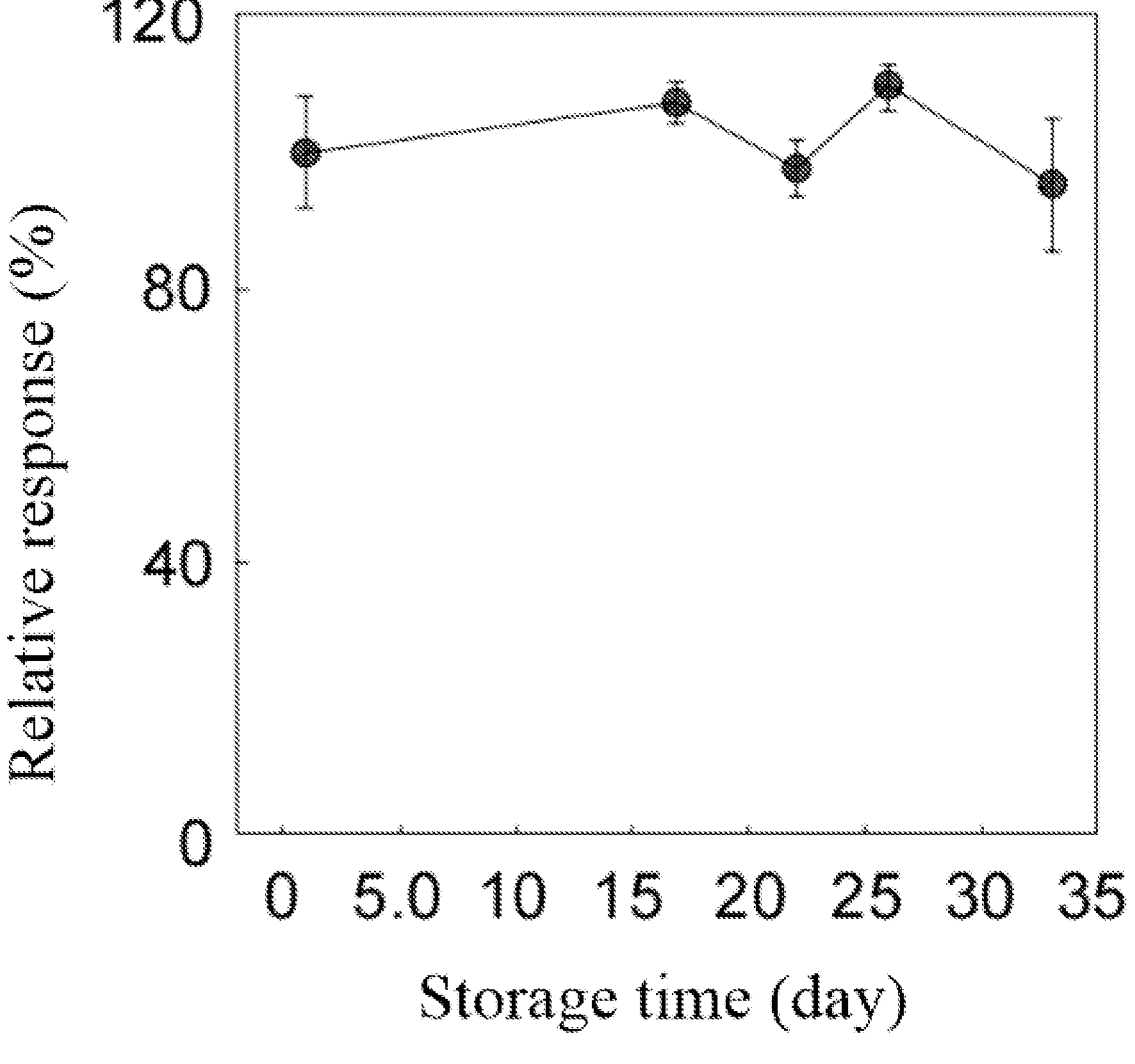
FIG. 13 shows a relative response diagram of creatinine in the PBS solution determined by a creatinine biosensor in an example of the present disclosure.
Figure 14:
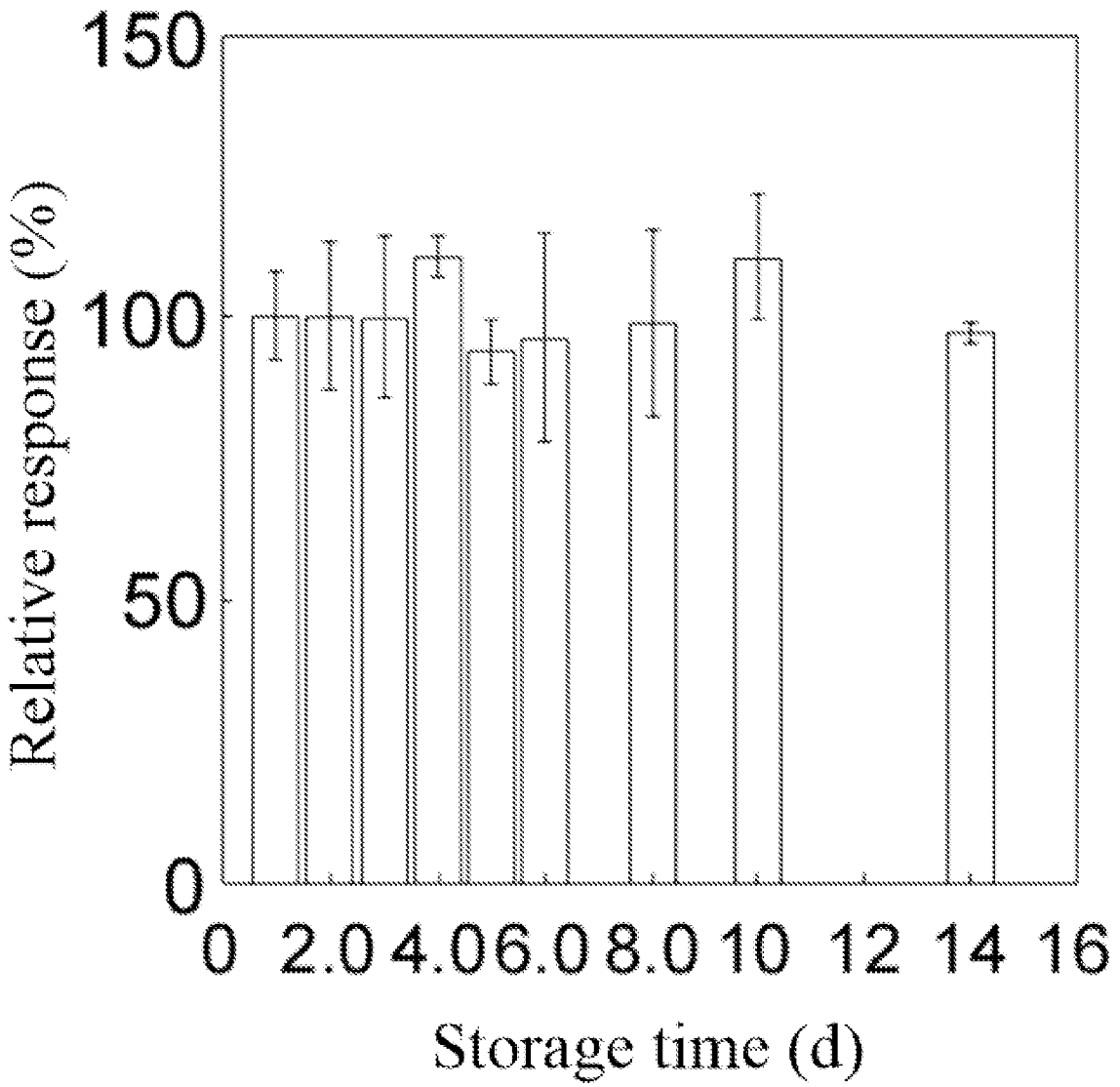
FIG. 14 shows a relative response diagram of the biosensor in a PBS solution containing 5 mM glucose in an example of the present disclosure.
Figure 15:
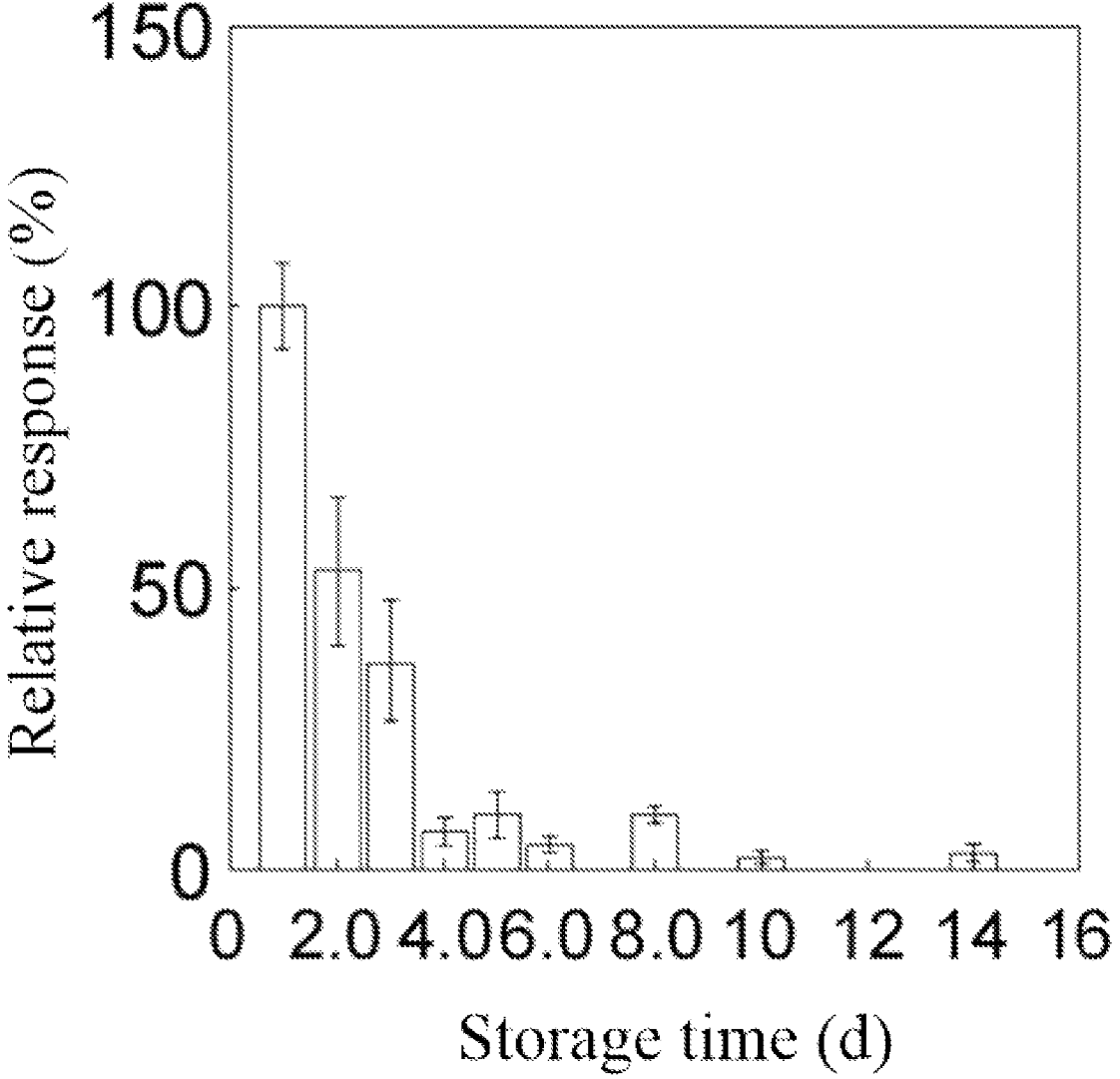
FIG. 15 shows a relative response diagram of an enzyme and a GA-layer biosensor in the PBS solution containing 5 mM glucose in an example of the present disclosure.
Figure 16:
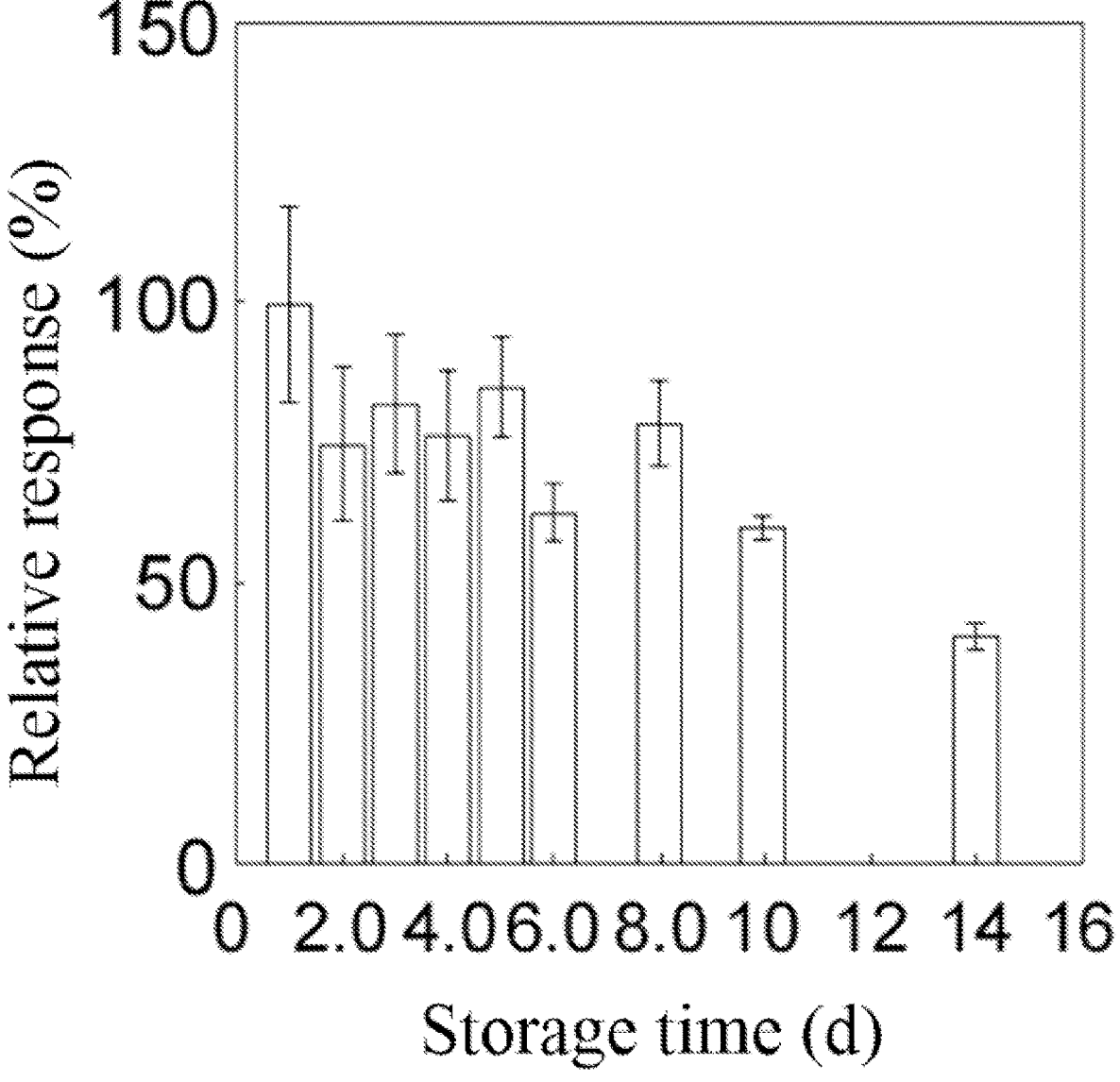
FIG. 16 shows a relative response diagram of a biosensor without a PANI layer in the PBS solution containing 5 mM glucose in an example of the present disclosure.
Figure 17:
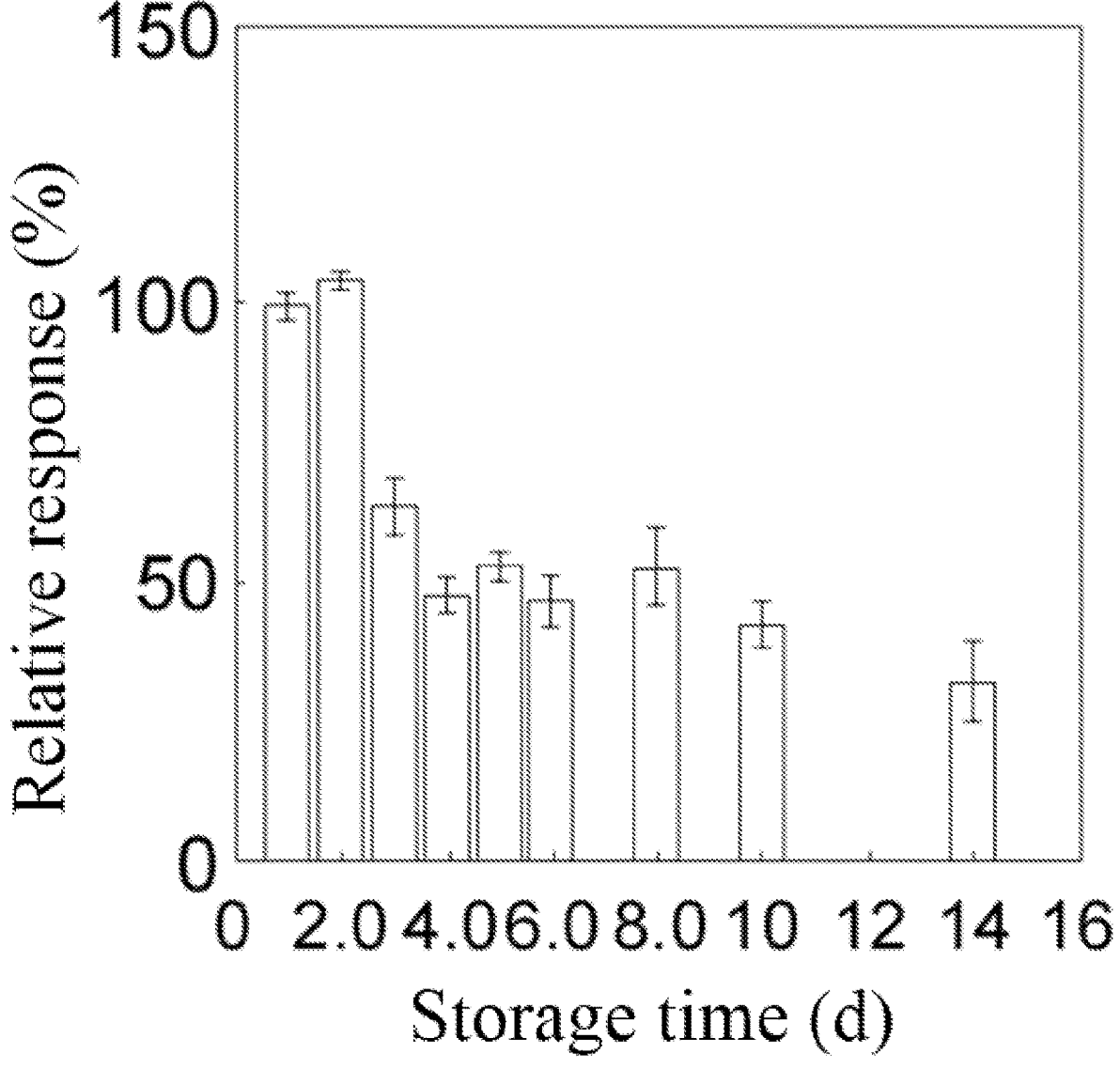
FIG. 17 shows a relative response diagram of a biosensor without a PU layer in the PBS solution containing 5 mM glucose in an example of the present disclosure.
Figure 18:
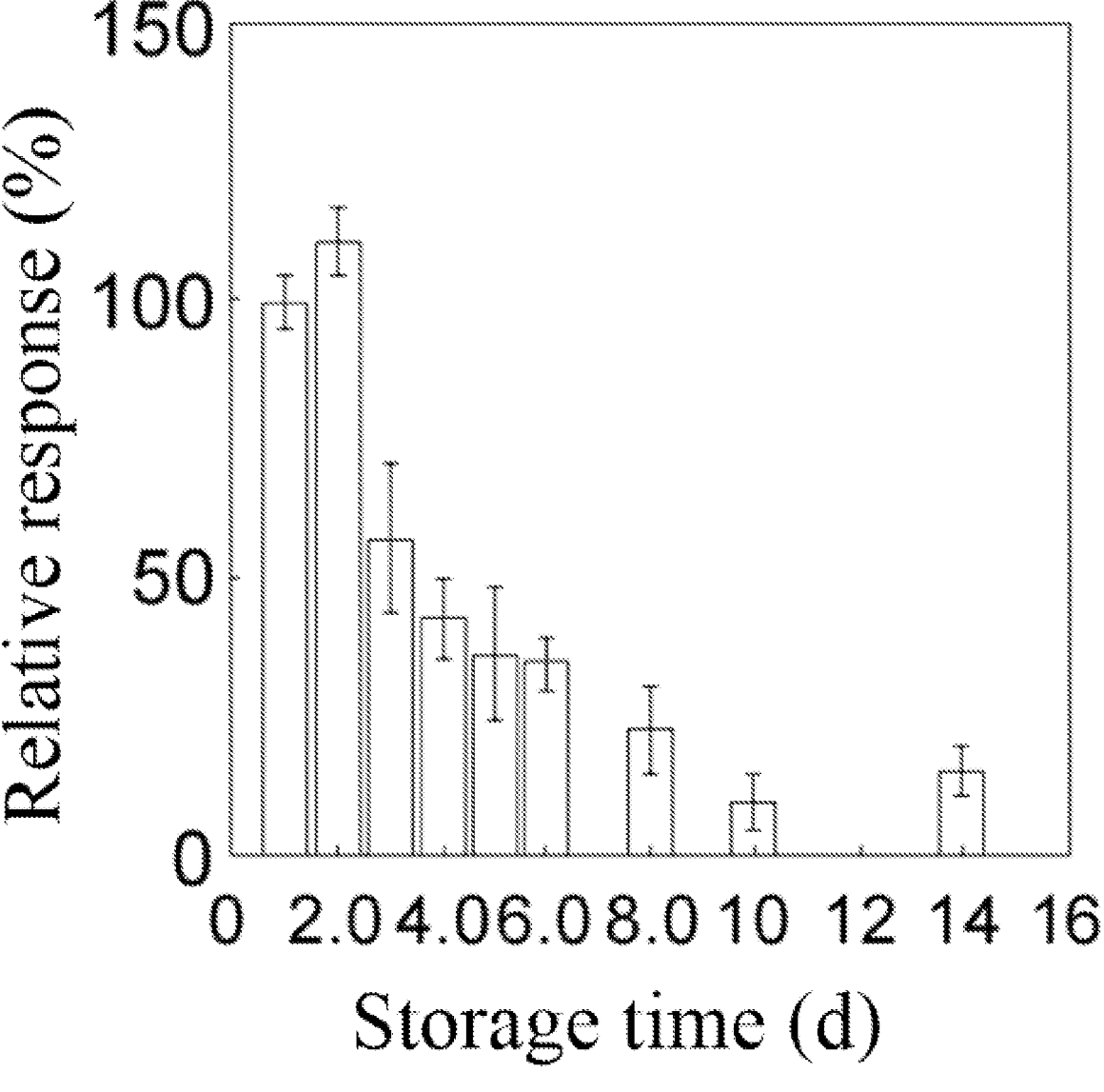
FIG. 18 shows a relative response diagram of a biosensor without a PVA/PEG layer in the PBS solution containing 5 mM glucose in an example of the present disclosure.

In FIG. 11, each error bar came from three biosensors. The PVA/PEG content also had little effect on the sensitivity of the biosensor to detect uric acid. The relative responses ranged from 94.59% for 2% PVA-8% PEG to 104.49% for 2% PVA-0.5% PEG. The results indicated that the content and mass ratio of PVA/PEG film had no significant effect on an electrochemical performance of the biosensors. However, a higher PVA content showed a better stabilizing effect on the enzymes, and 8% PVA-2% PEG was optimal as the biosensor.

Test 4

The relative response value of the uric acid biosensor was determined in PBS containing 0.4 mM uric acid. The results were shown in FIG. 12.

Test 5

The relative response value of the creatinine biosensor was determined in PBS containing 0.4 mM creatinine. The results were shown in FIG. 13. Errors came from three biosensors, and the creatinine biosensor has desirable storage stability. After storage at room temperature for 33 d, the creatinine biosensor had an initial response rate of 95.05%.

Test 6

The room temperature stability of the biosensor was determined at different storage times in the presence of 5 mM glucose. The results were shown in FIG. 14. The biosensor showed an initial response rate of 97.09% after storage for 14 d.

Test 7

The stability of an enzyme and a GA-layer biosensor at room temperature in PBS containing 5 mM glucose was determined at different storage times. The results were shown in FIG. 15. When there were only the enzyme and the GA layer on the working electrode, the relative response value at day 14 was only maintained at 2.53%.

Test 8

The room temperature stability of the biosensor without a PANI layer in PBS solution containing 5 mM glucose was determined at different storage times. The results were shown in FIG. 16. The sensory signal at day 14 was 40.49% of an initial signal.

Test 9

The stability of the biosensor without a PU layer in PBS solution containing 5 mM glucose was determined at different storage times. The results were shown in FIG. 17. The sensory signal at day 14 was 32.09% of an initial signal.

Test 10

The room temperature stability of the biosensor without a PVA/PEG layer in PBS solution containing 5 mM glucose was determined at different storage times. The results showed that the sensory signal at day 14 was 14.97% of an initial signal.

In the present disclosure, a working principle of the electrochemical sensor is: uric acid is taken as an example. When detecting a sample to be tested, the sample is added according to a conventional method, and the uric acid undergoes a series of reactions with an enzyme composition immobilized on the working electrode. The uric acid decomposes to produce hydrogen peroxide and oxygen. The hydrogen peroxide catalyzes a redox reaction under the action of an electronic mediator, and electrons are transferred to the working electrode to generate current. Therefore, a content of the uric acid in the sample can be obtained according to the relationship between a relative response value and a concentration of the uric acid in the sample.

In the example, the stabilities of the uric acid biosensors with different enzyme substrates at room temperature were also determined. When only the enzyme layer was on the working electrode, an induction response dropped to 45.56% of an initial response at day 126. The GA layer could significantly improve the relative response on the day 126, with an increase of 81.66%; the GA/PVA/PEG layer could significantly improve the relative response on the day 126, with an increase of 92.66%. The results showed that the film with GA layer and PVA/PEG layer could significantly improve the storage stability of the biosensor. The uric acid biosensor was stored at room temperature for more than 4 months without obvious decline in performances.

The foregoing descriptions are only preferred implementations of the present disclosure, and the scope of the present disclosure is not limited to the foregoing embodiments. All technical solutions based on the idea of the present disclosure fall within the protection scope of the present disclosure. It should be noted that those of ordinary skill in the art can make several improvements and modifications without departing from the principles of the present disclosure. These improvements and modifications should also be considered as falling within the protection scope of the present disclosure.

What is claimed is:

1. A method for improving stability of an electrochemical sensor, comprising the following steps:

S1, manufacturing an electrochemical sensor, wherein a process for manufacturing the electrochemical sensor comprises micro/nanofabrication and screen printing; and wherein the electrochemical sensor is a three-electrode system comprising a reference electrode, a working electrode, and a counter electrode, or a two-electrode system comprising the working electrode and the reference electrode, or a two-electrode system comprising the working electrode and the counter electrode; and the working electrode is one or a combination of more selected from the group consisting of gold, platinum, and carbon;

S2, immobilizing a biosensitive molecular enzyme on the working electrode of the electrochemical sensor;

S3, setting an immobilization agent on a surface of the biosensitive molecular enzyme with the immobilization agents of polyaniline (PANI) and glutaraldehyde (GA); and S4, adding a protective film with a multilayer structure consisting of polyurethane (PU), polyvinyl alcohol (PVA), and polyethylene glycol (PEG) on a surface of the immobilization agent, such that the protective film is deposited on the working electrode to improve the stability of the electrochemical sensor.

2. The method for improving stability of an electrochemical sensor according to claim 1, wherein the process for micro/nanofabrication of the electrode system is selected from the group consisting of:

a process for the micro/nanofabrication of the three-electrode system comprises:

(1) preparation of the working electrode and the counter electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference electrode: conducting sputtering or metal evaporation to form a silver electrode, and immersing the silver electrode in a ferric chloride solution, such that some silver generates silver chloride through a chemical reaction, thereby obtaining a silver/chloride silver electrode; and a process for the micro/nanofabrication of the two-electrode system comprises:

(1) preparation of the working electrode: conducting metal evaporation or sputtering by the micro/nanofabrication to obtain a nano-gold layer or a nano-platinum layer, and then conducting electroplating on a surface of the nano-gold layer or the nano-platinum layer to form a Prussian blue layer, thereby obtaining a gold/Prussian blue electrode or a platinum/Prussian blue electrode; and (2) preparation of the reference/counter electrode: conducting sputtering or metal evaporation to form a silver electrode, and immersing the silver electrode in a ferric chloride solution, such that some silver generates silver chloride through a chemical reaction, thereby obtaining a silver/chloride silver electrode.

3. The method for improving stability of an electrochemical sensor according to claim 1, wherein the process for screen-printing the electrode system is selected from the group consisting of:

a process for the screen printing of the three-electrode system comprises:

(1) preparation of the working electrode and the counter electrode: conducting screen printing with a gold composite paste, or a platinum composite paste, or a carbon composite paste that generally comprise comprising an electronic mediator selected from the group consisting of Prussian blue; and (2) preparation of the reference electrode: conducting screen printing with a silver/silver chloride composite paste; and a process for the screen printing of the two-electrode system comprises:

(1) preparation of the working electrode: conducting screen printing with a gold composite paste, or a platinum composite paste, or a carbon composite paste; and (2) preparation of the reference/counter electrode: conducting screen printing with a silver/silver chloride composite paste.

4. The method for improving stability of an electrochemical sensor according to claim 1, wherein the biosensitive molecular enzyme is an enzyme or an enzyme mixture that is uricase for a uric acid sensor, or a mixture of creatinine amidohydrolase, creatine amidinohydrolase and sarcosine oxidase for a creatinine biosensor, or glucose oxidase for a glucose biosensor, or cholesterol oxidase for a cholesterol biosensor, or a mixture of lipase, glycerol kinase, and glycerol phosphate oxidase for a triglyceride biosensor.

5. The method for improving stability of an electrochemical sensor according to claim 1, wherein polyaniline (PANI) is added as an immobilization agent before immobilizing the biosensitive molecular enzyme.

6. The method for improving stability of an electrochemical sensor according to claim 5, wherein the protective film has a principal component of polyvinyl alcohol (PVA).

7. The method for improving stability of an electrochemical sensor according to claim 1, wherein glutaraldehyde is added as an immobilization agent.

8. The method for improving stability of an electrochemical sensor according to claim 7, wherein the protective film is a composite film prepared from PVA and polyethylene glycol (PEG).

9. The method for improving stability of an electrochemical sensor according to claim 1, wherein polyurethane is added after setting the immobilization agent.

* * * * *